Figure 1:
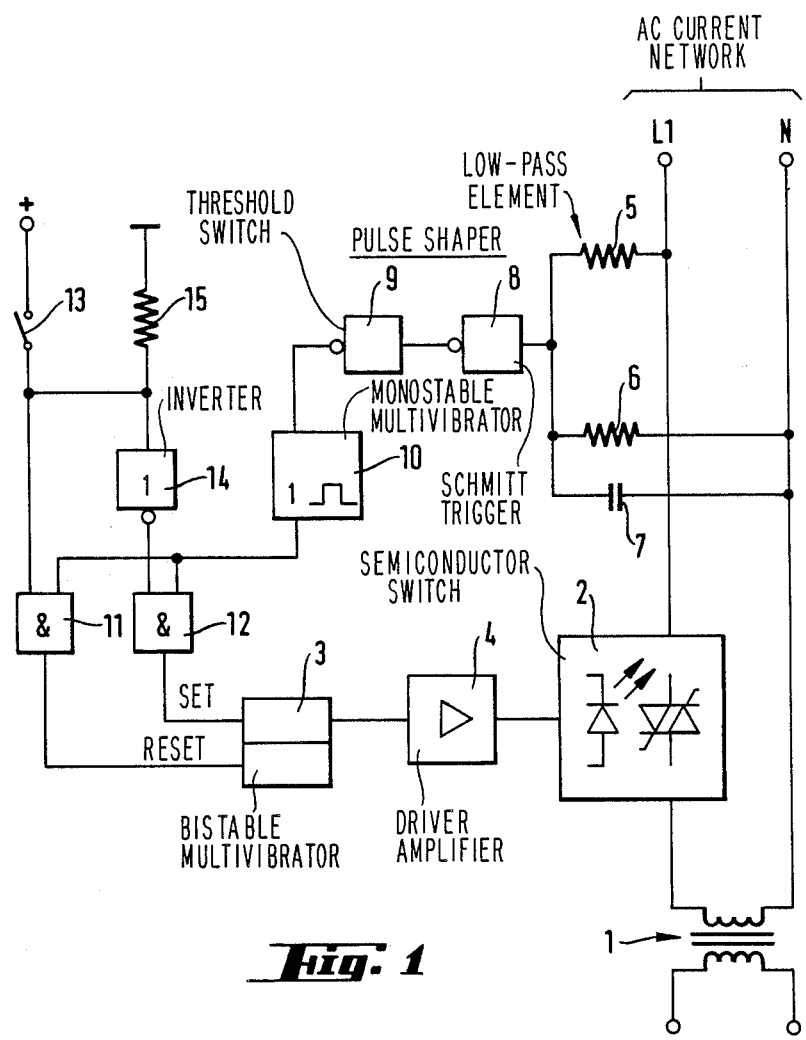

United States Patent [19]

Krüger

[11] Patent Number: 4,879,477

[45] Date of Patent: Nov. 7, 1989

[54] PROCEDURE AND CIRCUIT ARRANGEMENT FOR SWITCHING ON AN INDUCTANCE SUBJECT TO REMANENCE

[75] Inventor: Michael Krüger, Edingen-Neckarhausen, Fed. Rep. of Germany

[73] Assignee: Heidelberger Druckmaschinen AG, Heidelberg, Fed. Rep. of Germany

[21] Appl. No.: 40,573

[22] Filed: Apr. 17, 1987

[30] Foreign Application Priority Data

Apr. 25, 1986 [DE] Fed. Rep. of Germany ....... 3614057

[51] Int. Cl.$^4$ ............................................. H03K 17/22
[52] U.S. Cl. ................... 307/239; 307/247.1; 307/309; 307/643; 307/592
[58] Field of Search ............... 307/314, 514, 632, 643, 307/646, 647, 309, 262, 247.1, 592

[56] References Cited

U.S. PATENT DOCUMENTS

| | | | |
|---|---|---|---|
| 3,454,782 | 7/1969 | Sauter et al. | 307/314 |
| 3,903,476 | 9/1975 | Gawron et al. | 307/643 |
| 4,220,910 | 9/1980 | Chiba et al. | 307/643 |
| 4,602,166 | 7/1986 | Smith | 307/314 |

Primary Examiner—John Zazworsky
Attorney, Agent, or Firm—Herbert L. Lerner; Laurence A. Greenberg

[57] ABSTRACT

Method of switching on an inductance subject to remanence, to an AC voltage source is that switch-on takes place at a phase angle of the AC voltage, at which, with AC voltage applied, the same or similar magnetization conditions prevail as before switching on.

9 Claims, 2 Drawing Sheets

PROCEDURE AND CIRCUIT ARRANGEMENT FOR SWITCHING ON AN INDUCTANCE SUBJECT TO REMANENCE

The invention relates to a method and circuit arrangement for switching inductance subject to remanence, and more particularly of a transformer of an AC voltage source.

Depending on the previous status, when switching on ironbased inductances, particularly transformers, high inrush currents occur which are referred to as the "rush effect" in the relevant literature. Heretofore known devices to limit these inrush currents include variable resistors or chokes. A disadvantage of these devices is that an additional switching element is required to by-pass the current-limiting component. A further disadvantage results from the fact that high losses occur in the current-limiting component during switch-on. Furthermore, resistors with a negative temperature coefficient (NTC resistors or hot conductors) are known for limiting inrush currents. However, to ensure that penetration losses are kept to a minimum, despite adequate limitation of the inrush current surge during operation, these NTC resistors are operated at extremely high temperatures, thereby impairing their service life. In addition power losses constantly occur during operation.

The use of semiconductor switches facilitates so-called zero voltage switches where, after the switching command has been given, the semiconductor switch is fired during the next zero voltage passage with the aid of an integrated actuation circuit. On receiving an OFF command, the semiconductor switch is switched off during the next current passage. These zero voltage switches have the disadvantage that the point in time of the zero voltage passage for switching on the transformer generally represents the most unfavorable case. In this case, the difference with respect to the magnetic flux, which would exist also at the same time in the stationary condition, is greatest. Without taking into consideration the iron saturation, in the case of remanence-free sheet metal, the inrush current reaches double the value. Extremely high inrush currents occur, depending upon the location and the field strength of the remanent iron components, which are dictated by the previous status and the material, and also dependent upon the saturation limit. The semiconductor switch must be suitably dimensioned for these high inrush currents.

Suitably greater protective measures must be taken. High losses also occur during switch-on. It is possible that other consumers installed in the same network, experience interference under certain conditions due to the surge of the supply voltage. Other contactless switching elements attempt to overcome this disadvantage by performing switch-on immediately after giving the start command (so-called instantaneous switches). The point in time of switch-on is therefore purely based on chance. Consequently, although the frequency of the maximum inrush currents is reduced, the semiconductor switch must still be constructed to faciliate the maximum inrush current.

It is accordingly an object of the invention to provide a method and circuit arrangement for switching on an inductance subject to remanence with respect to an AC voltage source while avoiding the fore mentioned disadvantages.

With the foregoing and other objects in view, there is provided, in accordance with the invention, a method of switching on an inductance subject to remanence to an AC voltage source, which comprises switching on at a phase angle of the AC voltage at which with the AC voltage applied, the same or similar (i.e.substantially that same) magnetization conditions prevail as before switching on.

The method according to the invention ensures that the remanent iron components remain magnetized in the existing direction during switch-on. Sudden magnetization reversal which results in a higher inrush current does not occur.

In accordance with another mode, the method of the invention includes switching off and switching on at predetermined phase angles of the A.C. voltage. This offers the advantage that absolutely no additional expenditure is necessary to determine the magnetization status before switching on. In accordance with this mode of the method invention, both when switching on and when switching off, delay times of up to one period duration of the AC voltage can occur. In the majority of applications envisaged for the invention, this however, is of no disadvantage.

In accordance with a further mode, the invention includes switching off when there is zero passage of current, at which the current changes in a predetermined direction, and switching on at a phase angle of the AC voltage which results in an increase of the current in the same direction. This mode of the inventive method offers the advantage that the elements known in zero voltage switches can essentially be used to implement this procedure.

If the inductance is to be swiched off at any arbitrary point in time, in accordance with an added mode, the method according to the invention includes measuring the magnetic status of the inductance measured prior to switching on and, thereafter, determining the phase angle for switching on. The magnetic status of the inductance can be measured with the aid of a Hall sensor, for example.

In accordance with an additional mode, the method includes, when switching off of the inductance, storing a signal corresponding to the phase angle, and determining from the signal a phase angle for switching on. In this way, switching off the inductance at any arbitrary phase angle is also enabled. Suitable components are available, NV-RAMs for example, to facilitate storage. It is sufficient to store a bit if, during this procedure, switch-off is always performed at zero current passage the sign of which is not defined.

In accordance with another aspect of the invention, there is provided a circuit arrangement for performing a method of switching-on an inductance subject to remanence to an AC voltage, comprising in series with an inductance to be switched to an AC voltage, a bistable multivibrator connected to the semiconductor switch for actuating the switch, the bistable multivibrator having a setting input and a resetting input connected to the AC voltage source via a respective first input of a respective AND circuit and a respective pulse shaper, wherein the AND circuits have a respective second input for receiving thereat a switching signal.

This circuit arrangement can be easily realized with standard semiconductor components.

In accordance with another feature of the invention a pulse shaper comprises a threshold value switch and a monostable multivibrator.

In accordance with a further feature of the invention, a phase rotating element is provided, via which the AC voltage is fed to said threshold value switches.

In a concomitant feature of the invention wherein the phase rotating element is a low pass filter.

Other features which are considered as characteristic for the invention are set forth in the appended claims. Although the invention is illustrated and described herein as embodied in a method and circuit arrangement for switching on an inductance subject to remanence, it is nevertheless not intended to be limited to the details shown, since various modifications and structural changes may be made therein without departing from the spirit of the invention and within the scope and range of equivalents of the claims.

Figure 2A:
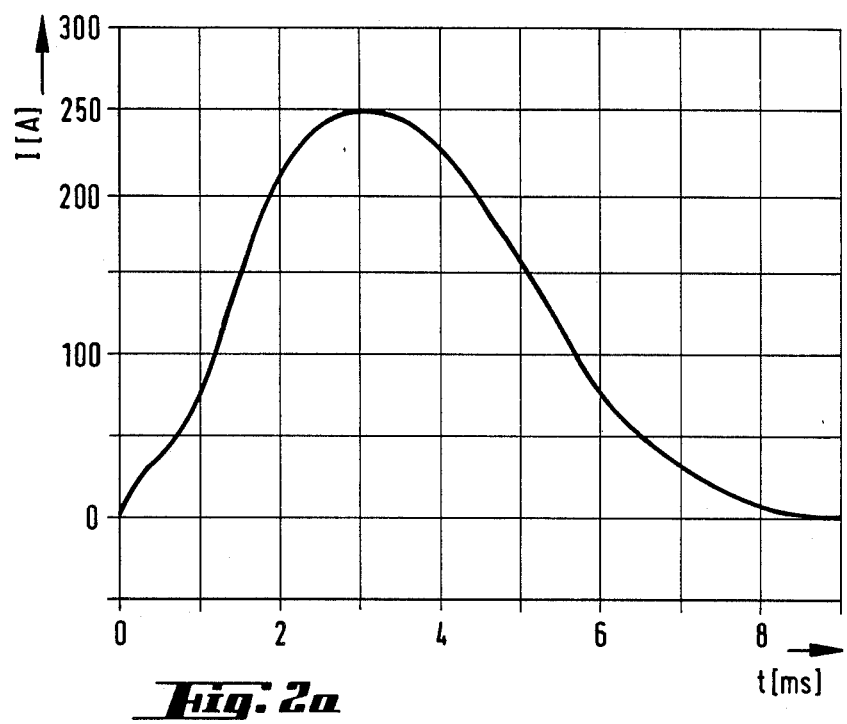
Figure 2B:
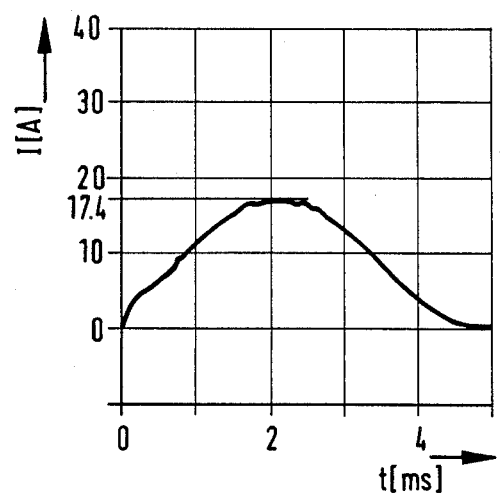

The construction and method of operation of the invention, however, together with additional objects and advantages thereof will be best understood from the following description of specific embodiments when read in connection with the accompanying drawings, in which:

FIG. 1 is a block diagram of a circuit arrangement for implementing the method of the invention; and FIGS. 2a and 2b are plot diagrams of the derivative trend with respect to time of inrush currents in accordance with the state of the art and with the use of the method according to the invention.

Referring now to the drawings and first, particularly, to FIG. 1 thereof, there is shown a primary winding of a transformer 1 connected on the one side with a neutral conductor N and on the other side, via a semiconductor switch 2, to a phase line L1 of an AC current network. The semiconductor switch 2 can be controlled with the aid of the circuit arrangement described hereinafter. Its switching status is stored in a bistable multivibrator 3 having an output which is connected via a driver amplifier 4 to a control input of the semiconductor switch 2. An optocoupler integrated in the semiconductor switch 2 affords potential isolation between the connected section of the semiconductor switch and the control input.

To determine the phase angle required for switching on and switching-off, the AC voltage is fed to a pulse-shaper via a phase-rotating low pass element formed of resistors 5 and 6 and a capacitor 7. The pulse-shaper in turn is formed of a threshold value switch (Schmitt trigger) 8 and a monostable multivibrator 10. Another threshold value switch 9 is connected between the threshold value switch 8 and the monostable multivibrator 10. The threshold value switch 8 generates square wave pulses from the positive half waves of the AC voltage supply. The sole purpose of the threshold value switch 9 is to cancel the inversion which occurred at the output of the threshold value switch 8. The monostable multivibrator 10 generates short pulses which are suitable for actuation of the bistable multivibrator 3.

The output of the monostable multivibrator 10 is connected via a first input of each AND circuit 11 and 12 to a respective setting and resetting input of the bistable multivibrator 3. A respective switching signal is directed to second inputs of the AND circuits 11 and 12. This signal is directed by a positive voltage directly to the second input of the AND circuit 11 via a switch 13, and to the second input of the AND circuit 12 via an inverter 14. When the switch 13 is non-conductive, a resistor 15 serves the purpose of feeding zero potential to the second input of the AND circuit 11 and positive potential to the second input of the AND circuit 12.

The switch 13 can be closed to connect the primary circuit 1 to the AC current network. As a result of the closure, output pulses of the monostable multivibrator 10 are fed by the AND circuit 11 to the bistable multivibrator 3. The first pulse which occurs after the switch 13 has closed, switches the bistable multivibrator 3 to the status which causes the semiconductor switch 2 to switch and connect the transformer 1 through to the AC-current network To switch off the transformer 1, the switch 13 is opened so that the input to the inverter 14 goes to zero potential via resistor 15, and so that a positive potential is applied to the second input of the AND circuit 12 by the inverter 14. The output pulses of the monostable multivibrator 10 are then directed to the setting input of the bistable multivibrator 3, resulting in an output voltage of the bistable multivibrator 3, which switches the semiconductor switch 2 to a non-conductive status, and thereby switching off the transformer.

As results of measurements that have been taken, there are shown in FIGS. 2a and 2b curves of inrush currents for a transformer not under load at a rated output of 3 KVA. FIG. 2a) shows the maximum inrush current without using the method of the invention which occurs when switch-on takes place at a phase angle resulting in demagnetization of the iron core. The peak current is therefore 250 A, while the integral of the inrush current amounts to 197 $A^2/s$.

In the case of the inrush current measured in accordance with the and represented in FIG. 2b invention, the peak current is 17.4 A and the current integral 0.63 $A^2/s$. Compared with the most unfavorable case, the peak inrush current is reduced by a factor of 14.4 and the current integral by a factor of 315 with the aid of the invention.

The invention is not restricted to the illustrated embodiment, but, rather it can be elaborated upon in various feasible ways. For example, a configuration referred to in the introduction hereto can be realized by coupling a Hall probe magnetically to the magnetic core of transformer 1. The Hall probe will produce an output voltage, depending upon the polarity of the magnetic field of the core, which results in a switch-off for various phase relationships of the AC voltage. For this purpose, a pulse shaper as shown in FIG. 1 can be provided for each half wave of the ac voltage, the output pulses of the pulse shaper being linked by logic gates to the output voltage of the Hall probe and to the on-off switching voltage of switch 13. In this case, it is necessary to supply the Hall Probe with operating voltage also—as shown in the circuit in FIG. 1—before switching on the inductance.

In a similar manner, data with respect to the phase relationship during switch-off and stored in a non-volatile memory can be evaluated for the purpose of switching on.

The method according to the invention can also be used to connect inductances to multiphase networks.

I claim:

1. Method of switching an inductance having remanence, on to and off from an AC voltage source by means of a controlled switch, comprising the steps of: forming a signal representing predetermined phase angles of said AC-voltage source corresponding to the magnetic state of the inductance before switching it on, and switching said controlled switch on by means of said signal.

2. Method according to claim 1 which comprises the steps of measuring the magnetic state of the inductance before switching on the controlled switch thereafter, determining said predetermined phase angles for switching on the controlled switch.

3. Method according to claim 1 which comprises the steps of forming a signal corresponding to said predetermined phase angles of the AC voltage at the moment of swiching off the controlled switch, and determining from the signal said predetermined phase angles of the AC voltage for switching on the controlled switch.

4. Method of switching an inductance having remanence, on to and off from an AC voltage source by means of a controlled switch, comprising the steps of: forming a signal representing a given phase angle of said AC-voltage source, and switching said controlled switch by means of said signal, and switching off and switching on said controlled switch at a predetermined angle of the AC voltage and determining said phase angle by means of a phase-rotating element.

5. Method according to claim 4 which comprises the steps of determining said phase angle such that said controlled switch is switched off at the moment of zero passage of current, at which moment the current changes in a predetermined direction, and switching on the controlled switch at the same phase angle of the AC voltage and wherein the current change at the moment of switching is in the same direction.

6. Circuit arrangement for switching on and off an inductance having remanence, to an AC voltage, comprising a semiconductor switch in series with the inductance to be switched, a bistable multivibrator connected to said semiconductor switch for controlling said switch, said bistable multivibrator having a setting input and a resetting input connected to a control signal representing a given phase angle of said AC voltage; a phase-rotating element having an input connected to the AC voltage and an output; a pulse shaper having an input connected to the output of said pulse shaper; first and second AND circuits each having first and second inputs, and respective first and second outputs, respectively connected to said resetting and setting inputs; a switching signal for switching on and off said inductance connected to said first input of said AND circuits; an output of said pulse shaper connected to said second of said AND circuits input; wherein said control signal is generated at the output of said bistable multivibrator.

7. Circuit arrangement according to claim 6 wherein said pulse shaper comprises a threshold value switch and a monostable multivibrator.

8. Circuit arrangement according to claim 7 wherein said phase rotating element is connected to said threshold value switch.

9. Circuit arrangement according to claim 8, wherein said phase rotating element is a low pass filter.

* * * * *